UNITED STATES PATENT OFFICE.

ALCIDE FRANÇOIS POIRRIER, OF PARIS, FRANCE, ASSIGNOR TO THE SOCIÉTÉ ANONYME DES MATIÈRES COLORANTES ET PRODUITS CHIMIQUES DE ST. DENIS, OF SAME PLACE.

SULFURETED DYE.

SPECIFICATION forming part of Letters Patent No. 561,277, dated June 2, 1896.

Application filed October 14, 1895. Serial No. 565,656. (Specimens.) Patented in France June 30, 1894, No. 239,714.

*To all whom it may concern:*

Be it known that I, ALCIDE FRANÇOIS POIRRIER, of Paris, France, have invented certain new and useful Improvements in the Manufacture of Sulfureted Coloring-Matters for Dyeing Fibers Without Mordants, (which was patented in France by addition, dated March 27, 1895, to French Patent No. 239,714, dated June 30, 1894,) which is fully described in the following specification.

In Patent No. 532,503, dated January 15, 1895, to R. Vidal and myself, we have described the manufacture of coloring-matters dyeing vegetable fibers without mordants by causing sulfur to react with or without alkalies being present on the substituted aromatic amins or the acetylated aromatic diamins.

I have now discovered that important coloring-matters can be obtained not by starting with paradiamins, as in the specification of the above-mentioned patent, but from meta diamins of the benzene series. These coloring-matters are not of the blue or green-black tints, like those produced according to the prior specification, but they are matters which dye red and yellowish tints remarkable for their fastness against washing and exposure.

Example I: One hundred kilos cresylene-diamin, two hundred kilos sulfur, and four hundred kilos sodium sulfid are for five hours heated from 200° to 225° centigrade. The product of the reaction is a black mass soluble in water, alkalies, and alkaline sulfids, giving a brown-red solution, but insoluble in acids. This coloring-matter can be directly applied to dyeing. It dyes cotton without mordant a yellowish-brown tint very fast against washing and exposure.

Example II: One hundred kilos nitroparatoluidin, two hundred kilos sulfur, and five hundred kilos sodium sulfid are heated for four or five hours from 200° to 240° centigrade. The product has the same properties as that of Example I.

The invention can in like manner be applied to analogous bodies, such as metaxylenediamin or paranitro orthotoluidin.

Having thus described my invention, what I claim as new is—

1. The method of preparing the coloring-matters, yellow, brown, and yellowish brown, dyeing vegetable fibers without mordant, by causing the action of sulfur, upon the metadiamins of the benzene series, substantially as specified, at a temperature between 200° and 250° centigrade.

2. The products of the above reaction, being coloring-matters soluble in water, alkalies, and alkaline sulfids producing a brown-red solution, and insoluble in acids, and dyeing vegetable fibers without mordants in yellowish tints, substantially as described.

In witness whereof I have hereunto signed my name in the presence of two subscribing witnesses.

ALCIDE FRANÇOIS POIRRIER.

Witnesses:
  JULES ARMENGAUD, Jeune,
  CLYDE SHROPSHIRE.